Oct. 6, 1925.

B. H. McDUFFIE

DISPENSING APPARATUS

Filed March 7, 1924 2 Sheets-Sheet 1

1,556,002

Benjamin H. McDuffie
INVENTOR

BY Victor J. Evans
ATTORNEY

WITNESS:

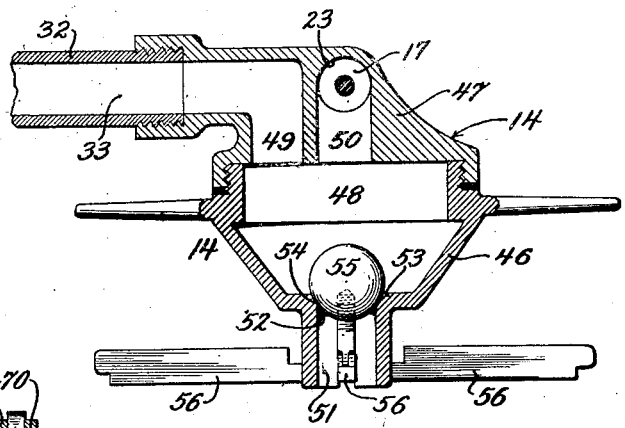
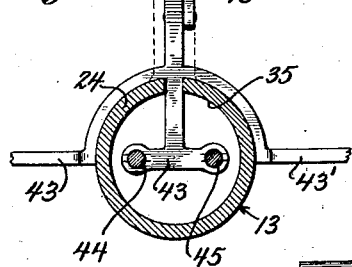
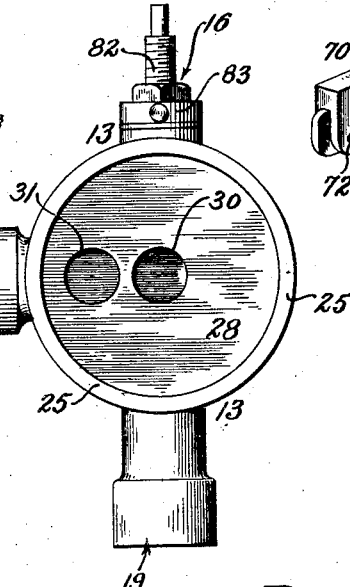
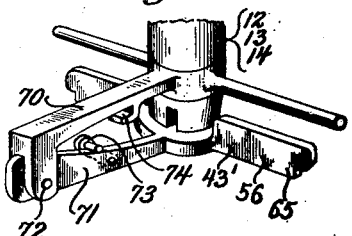

Patented Oct. 6, 1925.

1,556,002

UNITED STATES PATENT OFFICE.

BENJAMIN H. McDUFFIE, OF BROOKLYN, NEW YORK.

DISPENSING APPARATUS.

Application filed March 7, 1924. Serial No. 697,662.

*To all whom it may concern:*

Be it known that I, BENJAMIN H. McDUFFIE, a citizen of the United States, residing at Brooklyn, in the county of Kings and State of New York, have invented new and useful Improvements in Dispensing Apparatus, of which the following is a specification.

This invention relates to dispensing apparatuses.

More particularly the invention relates to apparatuses suitable for use in restaurants and similar places with which patrons may serve themselves.

Some of the objects of the present invention are: to produce a self-service apparatus from which beverages may be drawn two at one time, or one at one time, at the will of an individual; to facilitate the serving of patrons in an economic manner; to employ in an apparatus of the character mentioned liquid-containers and means including valves selectively operable for the drawing of the liquids from the said liquid-containers two at one time with but a single operation, or one at a time with but a single operation; to provide means for facilitating the cleaning of said valves. With these and other objects in view the invention resides in the provision, combination, construction and the relative disposition of parts hereinafter fully described and illustrated in the accompanying drawing, in which:—

Figure 6 is a sectional view on the line 6—6 of Figure 2.

Figure 7 is an elevation of the under face of the top part of the casing of the duplex-faucet forming a part of the apparatus.

Figure 8 is a section view taken on line 8—8 of Figure 4.

Figure 9 is a perspective view showing the means for retaining the faucets in open position.

Figure 1:
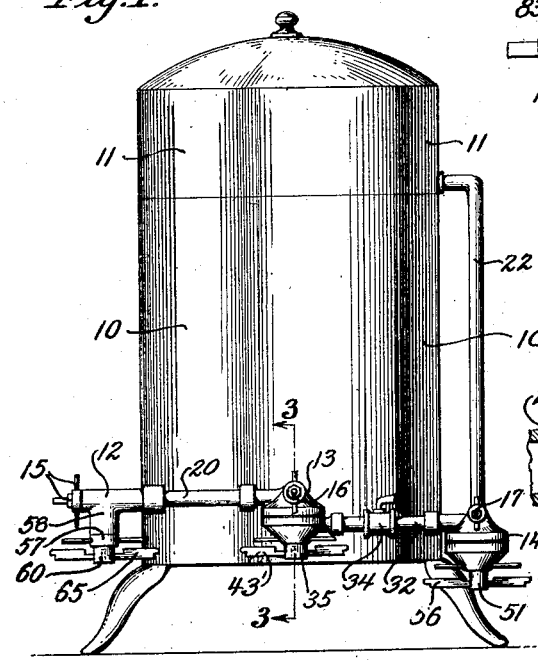
Figure 1 is a side elevation of a coffee and milk urn equipped in accordance with the present invention.
Figure 3:
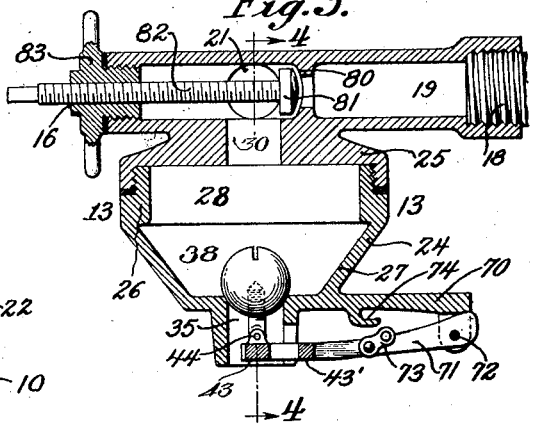
Figure 3 is a detail sectional view taken on the lines 3—3 of Figure 1.
Figure 4:
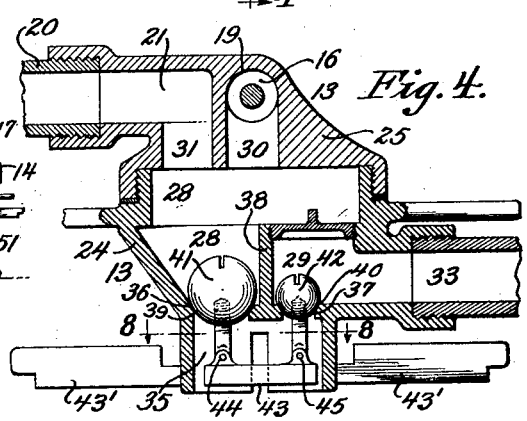
Figure 4 is a sectional view on the line 4—4 of Figure 3.
Figure 2:
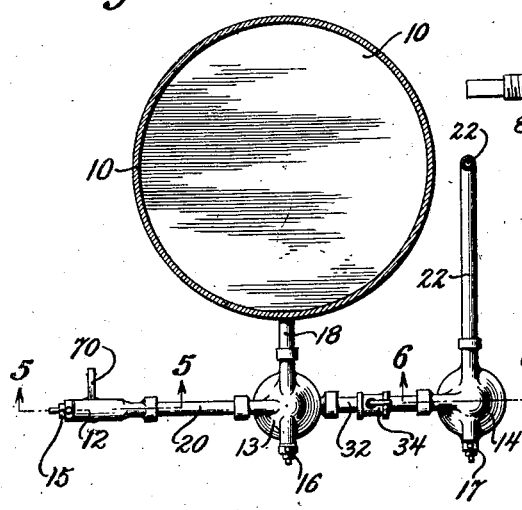
Figure 2 is a sectional plan view.
Figure 5:
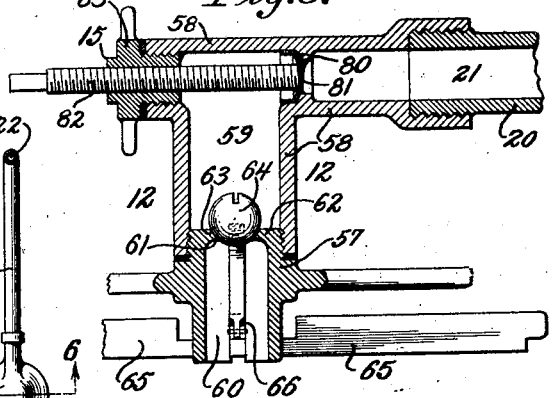
Figure 5 is a sectional view on the line 5—5 of Figure 2.

At the beginning, it has been manifested that the apparatus of the present invention is to be used for dispensing coffee and milk together with but a single operation, or separate with but a single operation, so that at the will of a restaurant-patron, the patron may draw for himself or herself, milk alone; coffee alone; or the milk and coffee together. It will at once be obvious that any other liquids, beverages, or drinks may be dispensed with the apparatus. In the present disclosure of the invention, the containers 10 and 11 are assumed to contain coffee and milk respectively. In the present instance, three faucets 12, 13 and 14 are employed with which the flows of the coffee and milk are effected. Stop and regulating valves 15, 16 and 17 are employed for either cutting off the flows of coffee and milk or for regulating the flow thereof to the said faucets. A pipe 18 is connected to the coffee-container 10 and to the faucet 13 to establish a passage 19 between the coffee-container and the faucet 13. The valve 16 is arranged in the passage 19. A pipe 20 connects faucet 13 to faucet 12 to establish a passage 21 therebetween. A pipe 22 is connected to the milk-container 11 and to the faucet 14 to establish a passage 23 between the milk-container 11 and the faucet 14. The valve 15 is arranged in the passage 21, and the valve 17 is arranged in the passage 23.

The faucets of the present invention are analogous to the faucet disclosed in an application filed by me March 28, 1921, and having Serial Number 456,356.

The faucet 13 includes a casing 24 which is screwed to a cover section 25 to which the pipes 18 and 20 are connected. The casing 24 is formed with angularly disposed walls 26 and 27 which define chambers 28 and 29. The cover section 25 has openings 30 and 31 therein—see Figure 7. The passage 19 leads to the opening 30, and the passage 21 leads to the opening 31. It will now be manifest that the passages 19 and 21 are opened to, or, in other words, that they communicate with the chamber 28. The passage 23 formed by the pipe 22, allows the flow of milk from the milk-container 11 to the faucet 17, and a pipe 32 connects the faucet 14 to the faucet 13, thus establishing a passage 33 to the chamber 29. A stop and regulating valve 34 is connected in the pipe 32 to either stop the flow of milk, or to regulate the flow thereof through the passage 33. The passage 33 communicates with the chamber 29 of the faucet 13 through the casing 24 thereof. An outlet 35 communicates with the chambers 28 and 29 through apertures 36 and 37 in the partition 38 of the casing 24. Valve means are employed for effecting the flows of coffee and milk through the outlet 35. The said valve means includes seats 39 and 40 at the apertures 36 and 37 respectively. Members 41 and 42 are adapted to coact respectively with the seats 39 and 40. The members 41 and 42 are connected to a cross arm 43 by jointed connections 44 and 45 respectively and a manipulator 43' to operate the members 41 and 42 is adapted to be engaged by a liquid container such as a cup or glass.

The faucet 14 includes a casing 46 screwed to a cover section 47. The cover section 47 is similar in construction to the cover section 25 of the faucet 13. The casing 46 forms a chamber 48 which communicates with the passages 23 and 33 by virtue of the openings 49 and 50 in the cover section 47. Valve means is employed for effecting the flow of milk through an outlet 51 which communicates with the chamber 48 by virtue of an aperture 52 in the partition 53 of the casing 46. The valve means includes a seat 54 at the aperture 52, a member 55 which co-acts with the said seat 54, a manipulator 56, and a jointed connection between the member 55 and the manipulator 56.

The faucet 12 includes a casing 57 screwed to a cover section 58 to which the pipe 20 is connected. The passage 21 formed by the pipe 20 leads to a chamber 59 formed by the casing 57. An outlet 60 communicates with the chamber 59 by virtue of an aperture 61 in a partition 62 within the casing 57. Valve means is employed for effecting the flow of coffee through said outlet 60. The valve means includes a seat 63 at the aperture 61, member 64 which co-acts with the seat 63, manipulator 65, and a jointed connection 66 between the member 64 and the manipulator 65.

In order that the flow of the coffee and milk through the faucet outlets, as the case may be, may be continuous, each faucet is provided with identical means presently described. An arm 70 is formed on the faucet casing and projects rearwardly therefrom. Each manipulator is formed with a rearwardly extending arm 71, pivoted to the arm 70 as at 72. The arm 71 has pivoted thereto a swinging member 73 adapted to be thrown into co-action with a hook 74 formed on the underside of the arm 70 to permit of a continuous flow through the valve. When in this position, the valve members of the respective faucets will be unseated and when the member 73 is released from the hook 74, the valve members will gravitate to their normal position in their particular valve seats. It will be manifest that by virtue of the provision of parts just described, it is possible to thoroughly clean the faucet valves.

The valves 15, 16 and 17 may be of any preferred form and in the present instance each consists of a seat 80 and valve member 81 which coacts with said seat. The member 81 is on the end of a screw 82 adjustable with relation to a detachable cap 83 which supports the screw.

What is claimed is:

1. An apparatus of the character described comprising a plurality of associated liquid containers, pipes extending from each of the liquid containers, a faucet casing for each pipe, means of communication between each faucet casing, a pair of valve members controlling one faucet casing and the means of communication respectively, a valve member controlling the other faucet casing and said pipes being associated with the faucet casings in a manner whereby one liquid may be dispensed at one casing and a mixture of said liquid with another liquid at the other casing.

2. A faucet of the character described comprising a casing provided with inlet and outlet openings, a valve for each opening, means operatively associated with each valve for the operation thereof, an arm extending from the casing adjacent one of the valved openings, a hook depending from the arm intermediate its ends, an arm pivoted at one end to the outer end of the arm first mentioned and having its opposite end pivotally secured to the valve operating means, a swinging member pivotally secured to the pivoted arm and being operatively associated with the hook for the purpose specified.

In testimony whereof I have affixed my signature.

BENJAMIN H. McDUFFIE.